United States Patent
Syracuse et al.

(10) Patent No.: US 7,068,036 B1
(45) Date of Patent: Jun. 27, 2006

(54) LITHIUM/CARBON MONOFLUORIDE (LI/CF$_x$) ELECTROCHEMICAL CELL PROJECTION MODEL

(75) Inventors: Kenneth C. Syracuse, Clarence Center, NY (US); Esther S. Takeuchi, East Amherst, NY (US)

(73) Assignee: WiWilson Greatbatch Technologies, Inc., Clarence, NY (US)

( * ) Notice: Subject to any disclaimer, the term of this patent is extended or adjusted under 35 U.S.C. 154(b) by 219 days.

(21) Appl. No.: 10/975,894

(22) Filed: Oct. 28, 2004

Related U.S. Application Data

(60) Provisional application No. 60/515,152, filed on Oct. 28, 2003.

(51) Int. Cl.
*G01N 27/416* (2006.01)
*H02J 7/00* (2006.01)
*H01M 4/58* (2006.01)

(52) U.S. Cl. ............... 324/427; 320/134; 429/231.7

(58) Field of Classification Search ............ 324/427, 324/426; 320/118, 136; 702/63; 429/50, 429/60, 91, 92, 231.7, 231.95, 245
See application file for complete search history.

(56) References Cited

U.S. PATENT DOCUMENTS

| | | | |
|---|---|---|---|
| 4,137,374 A | 1/1979 | Fritts | 429/50 |
| 5,606,243 A | 2/1997 | Sakai et al. | 320/134 |
| 5,658,682 A | 8/1997 | Usuda et al. | 429/92 |
| 5,659,240 A | 8/1997 | King | 322/124 |
| 5,703,469 A | 12/1997 | Kinoshita | 340/636.19 |
| 5,716,728 A | 2/1998 | Smesko et al. | 429/60 |
| 5,808,445 A | 9/1998 | Aylor et al. | 320/132 |
| 5,898,292 A * | 4/1999 | Takemoto et al. | 320/136 |
| 6,011,379 A | 1/2000 | Singh et al. | 320/132 |
| 6,045,941 A | 4/2000 | Milewits | 429/91 |
| 6,236,214 B1 | 5/2001 | Camp, Jr. et al. | 324/427 |
| 6,366,054 B1 | 4/2002 | Hoenig et al. | 320/132 |
| 6,451,483 B1 | 9/2002 | Probst et al. | 429/231.7 |
| 6,469,471 B1 * | 10/2002 | Anbuky et al. | 320/118 |
| 6,532,425 B1 * | 3/2003 | Boost et al. | 702/63 |
| 6,767,670 B1 | 7/2004 | Paulot et al. | 429/245 |
| 6,885,951 B1 * | 4/2005 | Richter | 702/63 |

* cited by examiner

*Primary Examiner*—Pia Tibbits
(74) *Attorney, Agent, or Firm*—Michael F. Scalise

(57) ABSTRACT

A model for estimating the discharge profile of a Li/CF$_x$ cell is described. The model uses as inputs the load at which the cell is subjected to and the planar surface area to estimate current density. Then, current density is used to estimate cell voltage at each 2% depth-of-discharge.

20 Claims, 3 Drawing Sheets

LITHIUM/CARBON MONOFLUORIDE (LI/CF$_X$) ELECTROCHEMICAL CELL PROJECTION MODEL

CROSS-REFERENCE TO RELATED APPLICATIONS

The present application claims priority based upon provisional application Ser. No. 60/515,152, filed Oct. 28, 2003.

BACKGROUND OF THE INVENTION

The present invention generally relates to the conversion of chemical energy to electrical energy. More particularly, the present invention relates to predicting or modeling the discharge performance of an alkali metal electrochemical cell having a carbonaceous cathode active material, such as of a Li/CF$_x$ couple. Every Li/CF$_x$ cell has a voltage capacity signature and as the cell is discharged, the relationship between the cell life or depth-of-discharge and voltage (mV) changes. Therefore, it is desirable to predict or model this signature prior to building a cell. This modeling is predicated on an estimation of the depth of discharge versus voltage relationship for the CF$_x$ cell.

SUMMARY OF THE INVENTION

The present invention relates to a method for expressing a model of the discharge voltage of a Li/CF$_x$ cell for a given load and planar interface area at a particular depth-of-discharge. The method uses load and planar interface area to estimate current density. The estimated current density is then used to estimate voltage at each 2% depth-of-discharge.

These and other aspects of the present invention will become more apparent to those skilled in the art by reference to the following description and to the appended drawings.

DETAILED DESCRIPTION OF THE PREFERRED EMBODIMENTS

Figure 1:
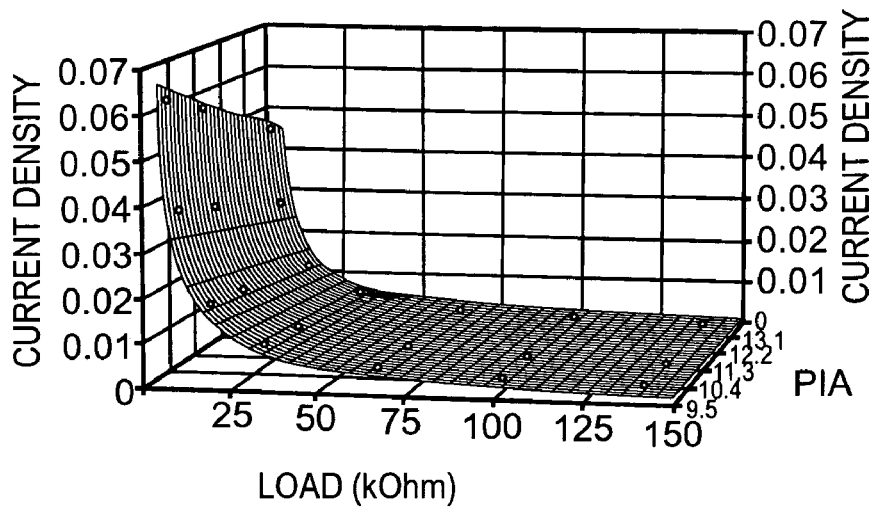
FIG. 1 is a graph constructed from the relationship between load (kΩ) and planar interface area from a sample of Li/CF$_x$ cells in order to estimate current density at 10% DoD for a Li/CF$_x$ cell.

For the purpose of this invention, the following terms are defined as follows:

The electrolyte-to-cathode (E/C) weight ratio is based on the weight of the electrolyte filled into the casing to the gram amount of CF$_x$ active material in the cathode.

By CF$_x$ is meant any fluorinated carbon active material including those represented by the formula $(C_2F)_n$.

L designates a low rate Li/CF$_x$ cell having a cathode pressed density of about 1.40 g/cc and an E/C ratio of about 0.90.

M designates a medium rate Li/CF$_x$ cell having a cathode pressed density of about 1.268 g/cc and an E/C ratio of about 1.20.

The planar interface area (PIA) is the anode/cathode contact area (cm$^2$) and is equal to the minimum anode planar area/cathode planar area, regardless whether the cell is newly built or is partially discharged. This parameter changes as the cell is discharged from 0% DoD to 100% DoD.

Current density (mA/cm$^2$) is defined as the ratio of current to the planar interface area in milliamps per square centimeter.

Depth of discharge (DoD) is equal to the actual mAhr/total capacity (mAhr)×100%. This is the ratio of the achieved capacity at any given point in time to the nominal cathode capacity times 100%.

The electrochemical cell of the present invention comprises an anode of a metal selected from Groups IA, IIA and IIIB of the Periodic Table of the Elements, including lithium, sodium, potassium, etc., and their alloys and intermetallic compounds including, for example, the alloys Li—Si, Li—Al, Li—B and Li—Si—B. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary. Preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. The anode current collector has an extended tab or lead contacted by a weld to a cell case of conductive metal in a case-negative electrical configuration. Alternatively, the anode may be formed in some other geometry, such as a bobbin shape, cylinder or pellet to provide a low surface cell design.

The electrochemical cell further comprises a cathode of electronically conductive material that serves as the other cell electrode. The electrochemical reactions at the cathode involve conversion of ions that migrate from the anode to the cathode into atomic or molecular forms. The cathode preferably comprises fluorinated carbon represented by the formula $(CF_x)_n$ wherein x varies between about 0.1 to 1.9 and preferably between about 0.5 and 1.2 and $(C_2F)_n$. For both kinds of material, the parameter n refers to the number of monomer units, which can vary widely. These electrode active materials are composed of carbon and fluorine, and include graphitic and nongraphitic forms of carbon, such as coke, charcoal or activated carbon.

Before fabrication into an electrode for incorporation into an electrochemical cell, the fluorinated carbon active material is preferably mixed with a binder material that is preferably a fluoro-resin powder such as powdered polytetrafluoroethylene (PTFE) or powdered polyvinylidene fluoride (PVDF). More preferably, powdered polytetrafluoroethylene or powdered polyvinylidene fluoride is present in the cathode mixture at, by weight, about 1% to about 5%.

Further, up to about 10%, by weight, of a conductive diluent is preferably added to the cathode mixture to improve conductivity. Suitable materials for this purpose include acetylene black, carbon black and/or graphite or a metallic powder such as powdered nickel, aluminum, titanium and stainless steel. The cathode active mixture thus includes, by weight, a powdered fluoro-polymer binder present at up to about 4%, a conductive diluent present at up to about 5%, remainder being the cathode active material. The preferred cathode active mixture comprises 91.1% $CF_x$ combined with 5% acetylene black or graphite and 3.9% PTFE, by weight.

The cathode active mixture is pressed onto a suitable current collector selected from the group consisting of nickel, titanium, platinum, stainless steel, and gold. The preferred current collector material is titanium, and most preferably the titanium substrate has a thin layer of graphite/carbon coated thereto. The coating is provided as a finely divided graphite pigment in an alcohol-based epoxy resin solution. One of dipping, painting, doctor-blading, pressurized air atomization spraying, aerosolized spraying, or sol-gel deposition is used to contact the carbonaceous material to the current collector substrate. Spraying is a preferred method. The resulting carbonaceous coating is provided on the titanium current collector in a range of about 0.0001 inches to about 0.0010 inches, and more preferably in a range of about 0.0004 to 0.0005 inches (10 microns to about 12.7 microns).

A particularly preferred carbonaceous coating material is commercially available from Acheson Industries, Inc., Port Huron, Mich. under the designation ELECTRODAG 213®. This material is a colloidal suspension of graphite, propylene glycol methyl ether acetate, toluene, formaldehyde, xylene, 2-butoxyethanol and proprietary epoxy and thermoset resins. The thusly-coated titanium substrate is then sintered at a temperature of about 230° C. to about 350° C. for about 30 minutes to 1.5 hours. More preferably, the carbonaceous coating is applied to a thickness of about 0.0004 inches and sintered at about 300° C. for at least about one hour. For more detail regarding a carbonaceous coating on a titanium current collector incorporated into a $Li/CF_x$ cell, reference is made to U.S. Pat. No. 6,767,670 to Paulot et al., which is assigned to the assignee of the present invention and incorporated herein by reference.

Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material that is chemically unreactive with the anode and cathode active materials and both chemically unreactive with and insoluble in the electrolyte. Additionally, the separator material has sufficient porosity to allow flow therethrough of the electrolyte during the electrochemical reactions of the cell. Illustrative separator materials comprise fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

A preferred separator construction comprises a non-woven polypropylene fabric and polypropylene membrane. Preferably the non-woven fabric faces the cathode and the membrane faces the anode. That way, the non-woven layer acts as a wicking material to more effectively wet the cathode and act as a barrier to puncture of the membrane from loose carbon particles.

The electrochemical cell further includes a nonaqueous, ionically conductive electrolyte that serves as a medium for migration of ions between the anode and the cathode during the electrochemical reactions of the cell. The electrochemical reactions at the electrodes involve conversion of ions in atomic or molecular forms that migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a mixture of aprotic organic solvents comprising a low viscosity solvent and a high permittivity solvent. In the case of an anode comprising lithium, preferred lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, triglyme, tetragylme, dimethyl carbonate (DMC), 1,2-dimethoxyethane (DME), diethyl carbonate (DEC), and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 1.0 M to 1.4 M $LiBF_4$ in γ-butyrolactone.

The preferred form of the electrochemical cell is a case-negative design. This means that the anode/cathode couple is inserted into a conductive metal casing with the casing connected to the anode current collector. A preferred material for the casing is titanium although stainless steel, mild steel, nickel, nickel-plated mild steel and aluminum are also suitable. The casing header comprises a metallic lid of a material similar to that of the casing and has a sufficient number of openings to accommodate the glass-to-metal seal/terminal pin feedthrough for the cathode electrode. An additional opening is provided for the electrolyte. The cell is thereafter filled with the electrolyte solution described hereinabove and hermetically sealed such as by close-welding a stainless steel plug over the fill hole, but not limited thereto. The cell can also be constructed in a case-positive design, as is well known by hose skilled in the art.

A thusly-constructed $Li/CF_x$ cell is an acceptable power source for a myriad of electronic devices. Chief among them are implantable medical devices such as cardiac pacemakers, neurostimulators, drug pumps, cardiac defibrillators, and the like. The present invention is, therefore, directed to a methodology for deriving a model predicting the discharge profile of a Li/CF$_x$ cell before it is used to power a device, such as an implantable medical device. The model utilizes the relationship between current density and voltage, first estimating current density, then voltage. An estimation of current density is calculated from the relationship between load (kΩ) and planar interface area. For a given Li/CF$_x$ cell, the planar interface area is known, as is the load that will be applied to the cell during discharge. This estimation is done at every 2% DOD, and is defined by equation 1.

Current Density(mA/cm$^2$)=exp$^{(a+b(ln(load))+c(PIA))}$ (1)

Figure 2:
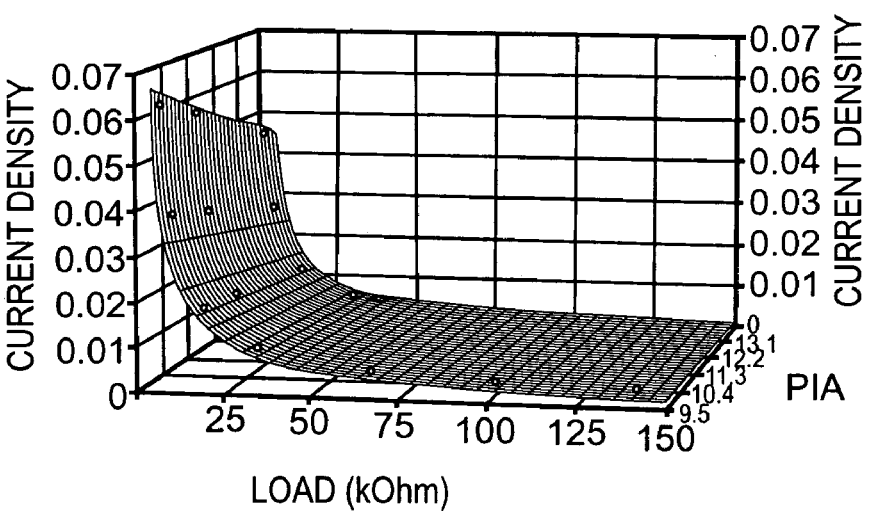
FIG. 2 is a graph constructed from the relationship between load and planar interface area from the sample of Li/CF$_x$ cells used to construct FIG. 1 in order to estimate current density at 50% DoD for a Li/CF$_x$ cell.
Figure 3:
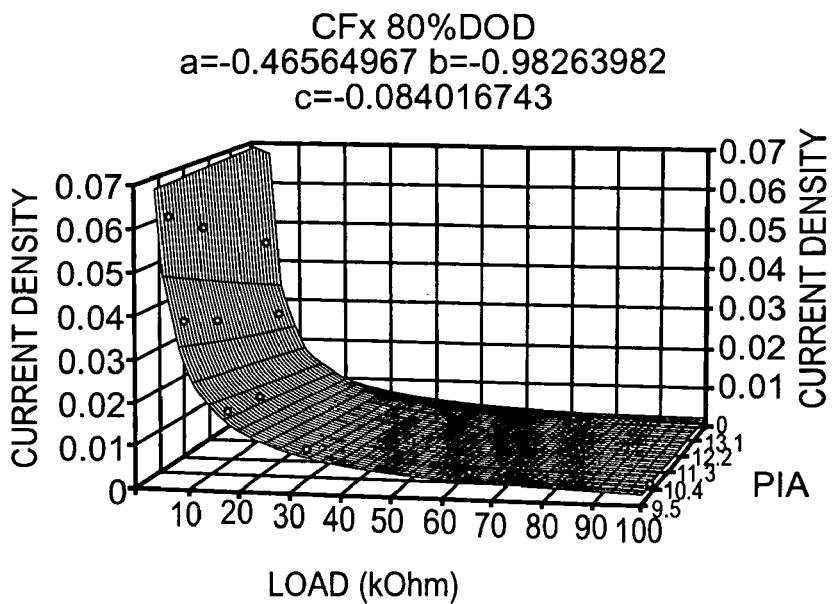
FIG. 3 is a graph constructed from the relationship between load and planar interface area from the sample of Li/CF$_x$ cells used to construct FIG. 1 in order to estimate current density at 80% DoD for a Li/CF$_x$ cell.

The solution to equation 1 and thus the coefficients a, b and c listed in Table 1 was derived from a compilation of empirical data over a range of discharge loads and planar interface areas for a sample of Li/CF$_x$ cells. The discharge loads ranged from 4.53 kΩ to 140 kΩ while the planar interface areas ranged from 9.88 cm$^2$ to 13.59 cm$^2$. For example, the graph of FIG. 1 shows the observed empirical data at 10% DoD from a sample of Li/CF$_x$ cells with the parameters load and PIA input into equation 1 and coefficients a=−0.42986199, b=−0.98730148 and c=−0.084871216. The graph of FIG. 2 shows the observed empirical data at 50% DoD from the same sample of Li/CF$_x$ cells used to generate FIG. 1 with the parameters load and PIA input into equation 1 and coefficients a=−0.44815779, b=−0.98343856 and c=−0.084436268. The graph of FIG. 3 shows the observed empirical data at 80% DoD from the same sample of Li/CF$_x$ cells used to generate FIG. 1 with the parameters load and PIA input into equation 1 and coefficients a=−0.46564967, b=−0.98263982 and c=−0.084016743.

|  | Table 1 | | | Table 2 | | |
| --- | --- | --- | --- | --- | --- | --- |
| DOD % | Coeff a | Coeff b | Coeff c | Coeff d | Coeff e | Coeff f |
| 2 | −0.44874 | −0.97561 | −0.08572 | 2791.314 | −388584 | 5.005552 |
| 4 | −0.4193 | −0.97766 | −0.08739 | 2792.048 | −83455.4 | 5.140659 |
| 6 | −0.40418 | −0.99078 | −0.08605 | 2798.93 | −96542.3 | 5.093113 |
| 8 | −0.42515 | −0.98773 | −0.08507 | 2802.65 | −98547.6 | 5.109263 |
| 10 | −0.42986 | −0.9873 | −0.08487 | 2806.025 | −104948 | 5.095078 |
| 12 | −0.43304 | −0.98669 | −0.08475 | 2807.593 | −107690 | 5.10494 |
| 14 | −0.43428 | −0.98625 | −0.08475 | 2807.503 | −104216 | 5.150434 |
| 16 | −0.43578 | −0.98548 | −0.08476 | 2807.895 | −102599 | 5.159354 |
| 18 | −0.43666 | −0.98563 | −0.08468 | 2807.676 | −102156 | 5.165641 |
| 20 | −0.43722 | −0.98558 | −0.08466 | 2808.756 | −108886 | 5.094757 |
| 22 | −0.43758 | −0.98504 | −0.08473 | 2808.324 | −111317 | 5.082459 |
| 24 | −0.43766 | −0.98493 | −0.08475 | 2807.215 | −111014 | 5.082435 |
| 26 | −0.43888 | −0.9847 | −0.0847 | 2806.17 | −112184 | 5.063475 |
| 28 | −0.44092 | −0.98432 | −0.0846 | 12804.735 | −114193 | 5.054587 |
| 30 | −0.44238 | −0.98423 | −0.08453 | 2805.998 | −122439 | 4.867996 |
| 32 | −0.4437 | −0.98388 | −0.0845 | 2804.852 | −124756 | 4.827202 |
| 34 | −0.4476 | −0.98367 | −0.08446 | 2802.707 | −123482 | 4.820422 |
| 36 | −0.44484 | −0.98381 | −0.08446 | 2800.169 | −123788 | 4.809594 |
| 38 | −0.44493 | −0.98375 | −0.08447 | 2797.478 | −124787 | 4.807 |
| 40 | −0.44505 | −0.98373 | −0.08449 | 2794.397 | −123714 | 4.806291 |
| 42 | −0.44543 | −0.98355 | −0.08452 | 2791.186 | −122016 | 4.794071 |
| 44 | −0.46634 | −0.98344 | −0.08449 | 2788.02 | −124089 | 4.762379 |
| 46 | −0.44701 | −0.98346 | −0.08446 | 2785.52 | −128829 | 4.708799 |
| 48 | −0.44742 | −0.98345 | −0.08446 | 2781.341 | −125503 | 4.703133 |
| 50 | −0.44816 | −0.98344 | −0.08444 | 2777.818 | −127199 | 4.659102 |
| 52 | −0.44887 | −0.9834 | −0.08442 | 2773.496 | −127641 | 4.640913 |
| 54 | −0.44964 | −0.9833 | −0.08441 | 2769.254 | −127793 | 4.608843 |
| 56 | −0.45015 | −0.98335 | −0.0844 | 2764.182 | −125199 | 4.596125 |
| 58 | −0.45107 | −0.98337 | −0.08436 | 2758.894 | −126689 | 4.564983 |
| 60 | −0.45123 | −0.98356 | −0.08438 | 2753.242 | −122646 | 4.438367 |
| 62 | −0.4519 | −0.98347 | −0.08438 | 2747.368 | −122951 | 4.401594 |
| 64 | −0.45317 | −0.9831 | −0.08438 | 2741.361 | −122802 | 4.331289 |
| 66 | −0.45397 | −0.98314 | −0.08436 | 2734.816 | −125622 | 4.271785 |
| 68 | −0.45528 | −0.98311 | −0.08431 | 2728.797 | −137255 | 4.160183 |
| 70 | −0.4563 | −0.98301 | −0.08431 | 2716.402 | −130371 | 4.297169 |
| 72 | −0.45505 | −0.98361 | −0.08441 | 2701.571 | −107067 | 4.337088 |
| 74 | −0.4569 | −0.98351 | −0.08434 | 2691.879 | −123335 | 4.221488 |
| 76 | −0.45833 | −0.98346 | −0.08431 | 2679.038 | −131652 | 4.171601 |
| 78 | −0.45967 | −0.98339 | −0.0843 | 2664.64 | −133520 | 4.109335 |
| 80 | −0.46565 | −0.98264 | −0.08402 | 2658.214 | −338497 | 3.637833 |
| 82 | −0.47156 | −0.98196 | −0.08374 | 2647.117 | −549115 | 3.064075 |
| 84 | −0.47688 | −0.98151 | −0.0835 | 2615.111 | −682268 | 2.711819 |
| 86 | −0.48026 | −0.98122 | −0.08342 | 2553.551 | −696730 | 2.217261 |
| 88 | −0.48823 | −0.98089 | −0.08304 | 2401.142 | −562033 | 2.186279 |
| 90 | −0.50218 | −0.9794 | −0.08247 | 2210.177 | −601766 | 1.760892 |
| 92 | −0.5112 | −0.97957 | −0.08222 | 1990.484 | −601694 | 2.746349 |
| 94 | −0.52333 | −0.97895 | −0.08203 | 1804.707 | −746879 | 3.054098 |
| 96 | −0.54112 | −0.97732 | −0.08176 | 1597.598 | −892074 | 5.886086 |
| 98 | −0.57683 | −0.97313 | −0.08065 | 1380.402 | −1627330 | 9.460652 |

After estimating the current density, the relationship between current density and voltage is estimated at each 2% DOD. The functional relationship between current density and voltage is expressed as:

$$\text{Voltage} = d + e(\text{current\_density})^3 + f(\ln(\text{current\_density})^2) \quad (2)$$

Figure 4:
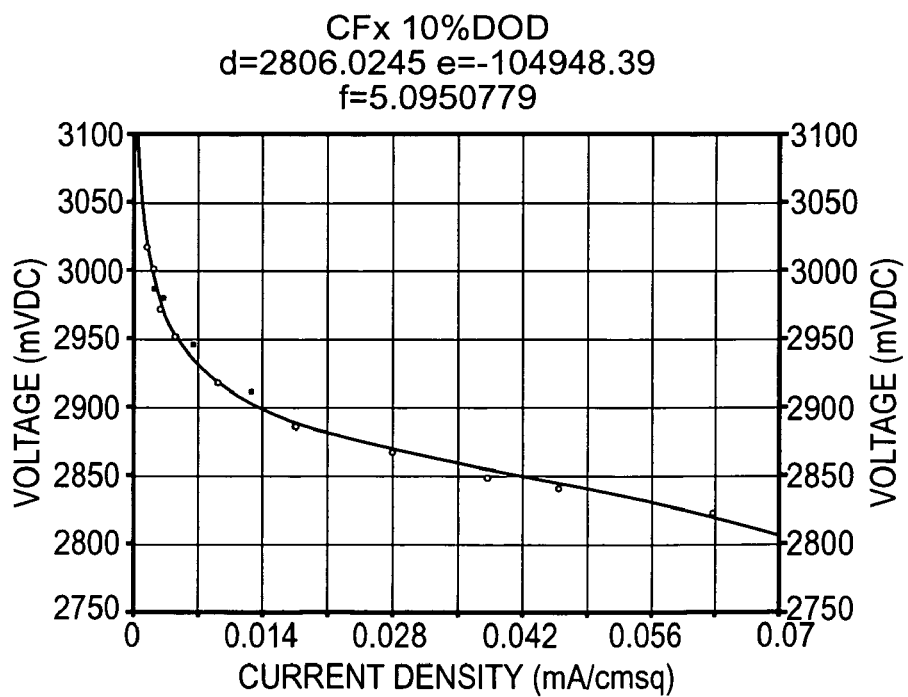
FIG. 4 is a graph constructed from the relationship between current density derived from the graph of FIG. 1 and voltage at 10% DoD for the same sample of Li/CF$_x$ cells.
Figure 5:
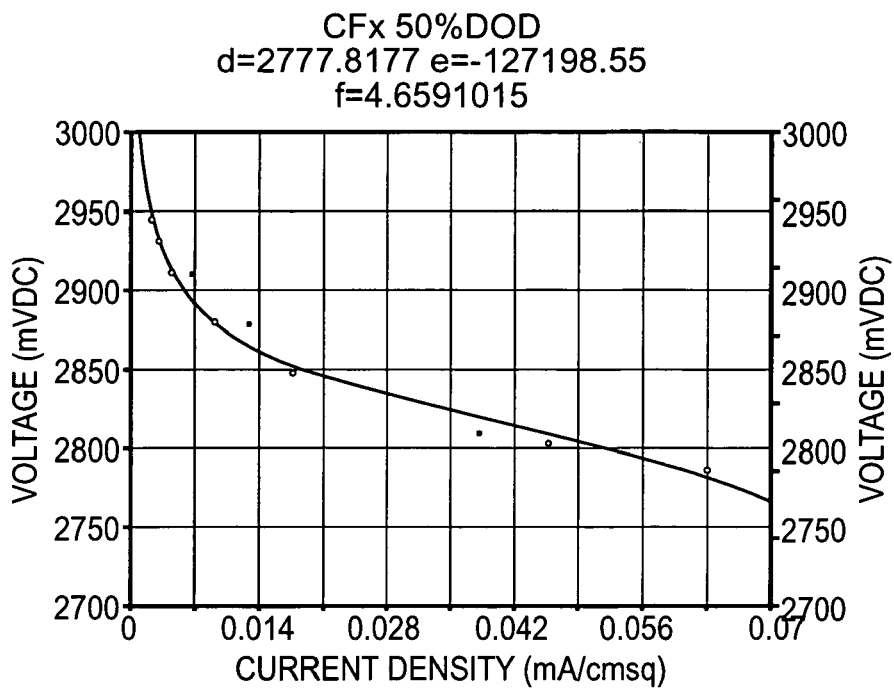
FIG. 5 is a graph constructed from the relationship between current density derived from the graph of FIG. 2 and voltage at 50% DoD for the same sample of Li/CF$_x$ cells.
Figure 6:
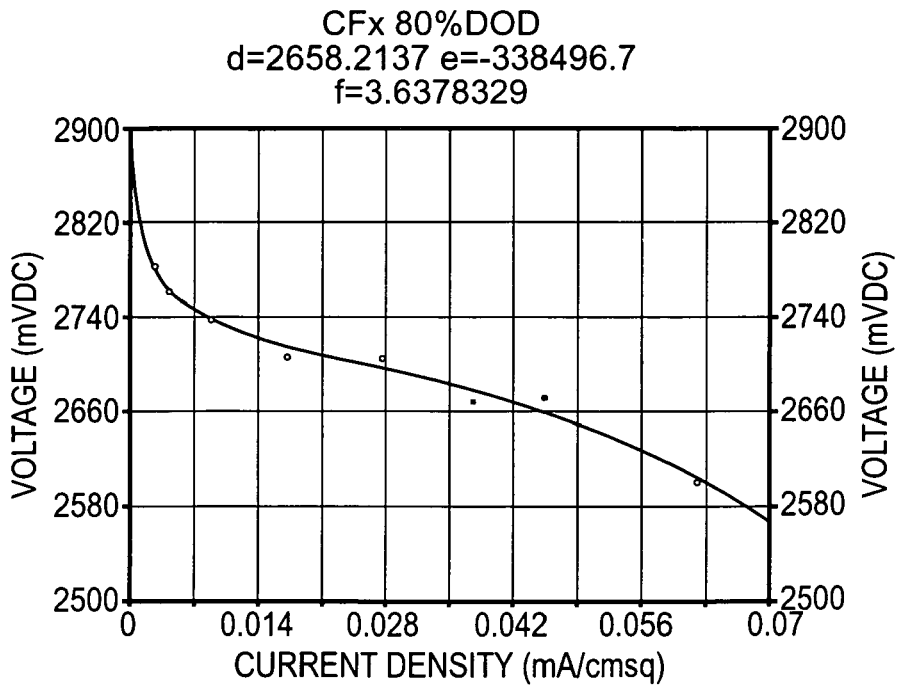
FIG. 6 is a graph constructed from the relationship between current density derived from the graph of FIG. 3 and voltage at 80% DoD for the same sample of Li/CF$_x$ cells.

Again, the solution to equation 2 and thus the coefficients d, e and f listed in Table 2 was derived from a compilation of empirical data from the same sample of Li/CF$_x$ cells used to construct FIGS. 1 to 3 and generate coefficients a, b and c for discharge loads ranging from 4.53 kΩ to 140 kΩ and planar interface areas ranging from 9.88 cm$^2$ to 13.59 cm$^2$ at each 2% DoD. For example, the graph of FIG. 4 was generated at 10% DoD from the sample of Li/CF$_x$ cells used to construct FIG. 1 with the coefficients d=2806.0245, e=−104948.39 and f=5.0950779. The graph of FIG. 5 was generated at 50% DoD from the sample of Li/CF$_x$ cells used to construct FIG. 2 with the coefficients d=2777.8177, e=−127198.55 and f=4.6591015. The graph of FIG. 6 was generated at 80% DoD from the sample of Li/CF$_x$ cells used to construct FIG. 3 with the coefficients d=2658.2137, e=−338496.7 and f=3.6378329.

Finally, the above current density and voltage equations are combined to estimate the discharge performance of a Li/CF$_x$ cell at a given load and PIA.

It should be understood that while the discharge loads applied to the sample of Li/CF$_x$ cells used to construct FIGS. 1 to 6 and the coefficients in Tables 1 and 2 ranged from 4.53 kΩ to 140 kΩ, that is not limiting. The present modeling technique is applicable to Li/CF$_x$ cells discharged at loads ±25% of the indicated range. Similarly, the sample of Li/CF$_x$ cells used to perform the present modeling had planar interface areas ranging from 9.88 cm$^2$ to 13.59 cm$^2$. However, the modeling results are applicable for Li/CF$_x$ cells having planar interface areas ±25% of the indicated range.

The Li/CF$_x$ cells used to develop the model fall into three general categories. The first ones were of a relatively low rate design, designated ####L. These cells comprised a titanium cathode current collector screen provided with a carbonaceous coating thereon. A titanium screen served as the anode current collector and a separator segregated the anode and cathode from each other. The cells had a PIA of 13.5884 cm$^2$ and a capacity of 1,321.4 mAhr. The electrodes were housed in a titanium casing and activated with 1.0 M LiBF$_4$ in γ-butyrolactone.

The second category of cells were of a relatively medium rate, designated ####M. These cells comprised a titanium cathode current collector screen provided with a carbonaceous coating. A titanium screen served as the anode current collector and a separator segregated the anode and cathode from each other. The cells had a PIA of 9.8838 cm$^2$ and a capacity of 3,241.6 mAhr. The electrodes were housed in a titanium casing and activated with 1.0 M LiBF$_4$ in γ-butyrolactone.

The third category of cells were of a relatively low rate and as before, designated ####L. These cells similar to the first type except that a nickel screen served as the anode current collector. Also, the cells had a PIA of 12.129 cm$^2$ and a capacity of 2,107.6 mAhr, and the electrodes were housed in a stainless steel casing.

It is appreciated that various modifications to the inventive concepts described herein may be apparent to those of ordinary skill in the art without departing from the scope of the present invention as defined by the appended claims.

What is claimed is:

1. A method for estimating the voltage profile for an electrochemical cell, comprising the steps of:
   a) providing electrochemical cell having an anode comprising lithium and a cathode comprising CF$_x$ as a cathode active material activated with a nonaqueous electrolyte;
   b) determining a planar interface area for the cell;
   c) discharging the cell under a known load;
   d) estimating a current density from a relationship between the known load and the planar interface area at a specified depth-of-discharge (DoD) using a first equation of: current density=$\exp^{(a+b(\ln(load))+c(PIA))}$;
   e) calculating a relationship between the current density and a voltage using a second equation of: voltage=$d+e(\text{current\_density})^3+f(\ln(\text{current\_density})^2)$; and
   f) combining the current density and the voltage to predict a voltage capacity at the specified depth-of-discharge.

2. The method of claim 1 including determining a change in the planar interface area from a first DoD to a second, later DoD.

3. The method of claim 1 including specifying the depth-of-discharge from 0% to 100% DoD.

4. The method of claim 1 including deriving the coefficients a, b and c for the first equation from a range of the discharging known loads and planar interface area readings at each 2% DoD for the cell.

5. The method of claim 3 wherein the discharging known loads readings ranged from 4.53 kΩ to 140 kΩ and the planar interface area readings ranged from 9.88 cm$^2$ to 13.59 cm$^2$.

6. The method of claim 3 including selecting the coefficients a, b and c from Table 1.

7. The method of claim 1 including deriving the coefficients d, e and f for the second equation from a range of the discharging known loads and planar interface area readings at each 2% DoD for the cell.

8. The method of claim 7 including selecting the coefficients d, e and f from Table 2.

9. The method of claim 1 wherein the predicted voltage capacity at the specified DoD is applicable for a Li/CF$_x$ cell the discharging known loads ranging from ±25% of 4.53 kΩ to 140 kΩ.

10. The method of claim 1 wherein the predicted voltage capacity at the specified DoD is applicable for a Li/CF$_x$ cell having a planar interface area ranging from ±25% 9.88 cm$^2$ to 13.59 cm$^2$.

11. The method of claim 1 including providing the anode comprising a lithium alloy.

12. The method of claim 1 including providing the cathode comprising a fluoro-resin binder.

13. The method of claim 1 including providing the cathode comprising a conductive diluent.

14. The method of claim 1 including providing the cathode active material supported on a current collector selected from the group consisting of nickel, titanium, platinum, stainless steel, and gold.

15. The method of claim 1 including providing the cathode active material supported on a titanium current collector having a graphite/carbon coating thereon.

16. The method of claim 1 including providing the electrolyte comprising a lithium salt selected from the group consisting of LiPF$_6$, LiBF$_4$, LiAsF$_6$, LiSbF$_6$, LiClO$_4$, LiO$_2$, LiAlCl$_4$, LiGaCl$_4$, LiC(SO$_2$CF$_3$)$_3$, LiN(SO$_2$CF$_3$)$_2$, LiSCN, LiO$_3$SCF$_3$, LiC$_6$F$_5$SO$_3$, LiO$_2$CCF$_3$, LiSO$_6$F, LiB(C$_6$H$_5$)$_4$, LiCF$_3$SO$_3$, and mixtures thereof.

17. The method of claim 1 including providing the electrolyte comprising at least one solvent selected from the group consisting of tetrahydrofuran, methyl acetate, diglyme, trigylme, tetragylme, dimethyl carbonate, 1,2-dimethoxyethane, diethyl carbonate, propylene carbonate, ethylene carbonate, acetonitrile, dimethyl sulfoxide, dimethyl formamide, dimethyl acetamide, γ-valerolactone, γ-butyrolactone, N-methyl-pyrrolidinone, and mixtures thereof.

18. The method of claim 1 including providing the electrolyte comprising 1.0 M to 1.4 M $LiBF_4$ in γ-butyrolactone.

19. The method of claim 1 including using the $Li/CF_x$ cell to power an implantable medical device.

20. A method for estimating the voltage profile for an electrochemical cell, comprising the steps of:
   a) providing electrochemical cell having an anode comprising lithium and a cathode comprising $CF_x$ as a cathode active material activated with a nonaqueous electrolyte;
   b) determining a planar interface area for the cell;
   c) discharging the cell under a known load;
   d) estimating a current density from a relationship between the known load and the planar interface area at a specified depth-of-discharge (DoD) using a first equation of: current density=$\exp^{(a+b(ln(load))+c(PIA))}$;
   e) calculating a relationship between the current density a and voltage using a second equation of: voltage=d+e (current_density)$^3$+f(ln(current_density)$^2$);
   f) combining the current density and the voltage to predict a voltage capacity at the specified depth-of-discharge; and
   g) repeating steps b to f for a second DoD with the planar interface area having changed to thereby predict a second voltage capacity at the second DoD.

* * * * *

UNITED STATES PATENT AND TRADEMARK OFFICE
CERTIFICATE OF CORRECTION

| | | |
|---|---|---|
| PATENT NO. | : 7,068,036 B1 | Page 1 of 1 |
| APPLICATION NO. | : 10/975894 | |
| DATED | : June 27, 2006 | |
| INVENTOR(S) | : Syracuse et al. | |

It is certified that error appears in the above-identified patent and that said Letters Patent is hereby corrected as shown below:

TITLE PAGE, ITEM (73) Assignee: delete "WiWilson Greatbatch Technologies, Inc." and insert --Wilson Greatbatch Technologies, Inc.--

Signed and Sealed this

Twenty-sixth Day of September, 2006

JON W. DUDAS
*Director of the United States Patent and Trademark Office*